Figure 1:
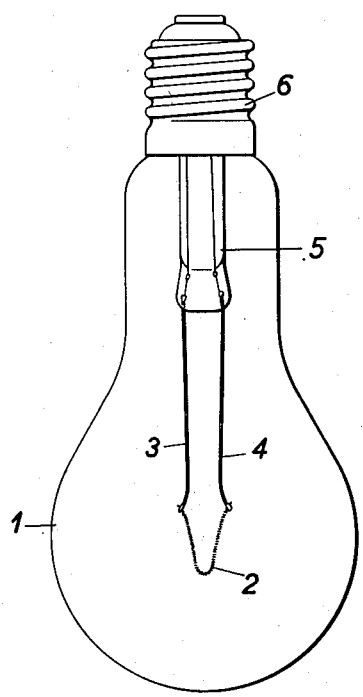

April 19, 1932.  K. AGTE  1,854,970

ELECTRIC LAMP AND THE ILLUMINATING BODY USED THEREIN

Filed May 13, 1931

INVENTOR.
KURT AGTE,
by Charles E. Tullar
ATTORNEY.

Patented Apr. 19, 1932

1,854,970

UNITED STATES PATENT OFFICE

KURT AGTE, OF BERLIN-LICHTERFELDE-OST, GERMANY, ASSIGNOR TO GENERAL ELECTRIC COMPANY, A CORPORATION OF NEW YORK

ELECTRIC LAMP AND THE ILLUMINATING BODY USED THEREIN

Application filed May 13, 1931, Serial No. 537,120, and in Germany May 20, 1930.

My invention relates to improvements in electric lamps and the illuminating body used therein.

As is known to those skilled in the art the life of electric incandescent lamps largely depends on the velocity of the vaporization of the incandescent body. For this reason the tantalum carbide the melting point of which is higher than that of the tungsten is particularly suitable as an incandescent body, because, at the same temperatures, the vaporization velocity of the tantalum carbide is smaller than that of the tungsten. However, heretofore the use of incandescent bodies consisting of pure tantalum carbide was not possible by reason of the small mechanical strength of the said carbide, and for this reason efforts have been made to make use of the valuable properties of the tantalum carbide by coating tungsten filaments with a thin layer of tantalum carbide. However, even such incandescent bodies have not proved successful for the reason that at the high incandescence temperatures there is an objectionable reaction between the tungsten core and the coating of tantalum carbide, the tungsten core being carburized and the tantalum carbide coating being changed chemically, so that the incandescent body is subject to premature destruction.

The object of the improvements is to provide an electric lamp and an incandescent body therefor which is free of the said objection, and with this object in view my invention consists in producing an incandescent body the core of which consists of or contains rhenium. As far as the melting point and the vaporization velocity are concerned rhenium is not materially distinguished from tungsten. But, as has been proved by experiment, it is distinguished from tungsten in so far as it does not produce a carbide. Therefore, when using an incandescent body which consists of or contains rhenium and which is coated with tantalum carbide, there is no carburizing of the core, and no injurious change of the chemical composition of the coating, the said components maintaining their favourable properties during a long period of life. Therefore, the vaporization and radiation of the incandescent body is mainly dependent upon the tantalum carbide.

Instead of manufacturing the incandescent body from pure rhenium metal I may use a core which consists of a rhenium alloy which has a high melting point and which is not subject to carburization, such for example as platinum-rhenium, chromium-rhenium or tungsten-rhenium. Good results are even obtained if the core contains rhenium or a suitable rhenium alloy only at its surface and immediately below the tantalum carbide, while the inner parts of the core consist of another metal or metal alloy. By the layer of rhenium or a rhenium alloy provided between the tantalum carbide coating and the inner part of the core, which may consist of tungsten or another metal of high melting point, diffusion of the carbon from the tantalum carbide to the inner part of the core is prevented, so that an objectionable change of the coating of tantalum carbide is impossible.

The incandescent body may be used in a vacuum or within a space filled with a suitable gas, and it may have any desired shape. Thus it may be in the form of a straight or helical wire or strip, or a rod, a pipe, a plate, a sphere or a hemisphere. The spherical or semi-spherical form will be used if the incandescent body is used in a closed arc-lamp as electrode.

Fig. 1 of the accompanying drawings illustrates a lamp employing an incandescent body constituted according to the invention.

Figure 2:
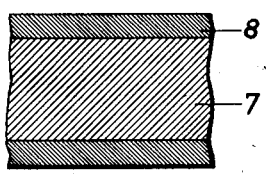
Figure 3:
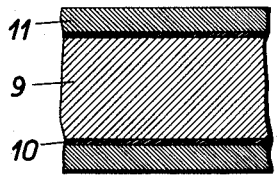

Figs. 2 and 3 illustrate on a larger scale sections of two filaments according to the invention.

In Figure 1 is shown an incandescent lamp comprising a bulb 1 containing a filament 2, connected to the conductors 3, 4, which are sealed into a stem 5 and joined to a base 6 in the usual way. The bulb may be evacuated or filled with a gas, such as argon, or nitrogen, at a pressure of say, two-thirds of an atmosphere. The filament 2 has been shown somewhat, diagrammatically as being a closely coiled helix and in practice it may be coiled even more closely than can be shown in the drawings. This is done to reduce heat losses.

The filament 2 shown in Fig. 2 consists of a core 7 and a coating 8. The core 7 consists preferably of pure rhenium or an alloy of rhenium of high melting point. The coating 8 consists of tantalum carbide.

The filament shown in Fig. 3 consists of a core 9, a thin layer 10 and a coating 11. The core 9 consists of tungsten, a tungsten alloy or another metal of high melting point. The thin layer 10 consists of pure rhenium or an alloy of rhenium of high melting point. The coating 11 consists of tantalum carbide.

In the manufacture of the new incandescent body I may proceed as follows:

*Example 1.*—A filament consisting of or containing for example tungsten is coated with a thin layer of rhenium, for example by precipitating the rhenium thereon in an atmosphere of rhenium chloride. The tungsten filament which has thus been coated with rhenium is further coated with tantalum, the said tantalum being preferably percipitated in an atmosphere of tantalum chloride. Thereafter the tantalum coating is carburized in a manner known in the art at a temperature of from 2200 to 2600° C. in a carbon containing atmosphere such as methane. The thickness of the layers of rhenium and tatalum carbide depends on the strength of the tungsten filament, and in some cases a thickness of the said layer of about 0.001 mm. is sufficient.

*Example 2.*—A filament of pure rhenium or a rhenium alloy such as platinum-rhenium, chromium-rhenium, or tungsten-rhenium, is coated with tantalum, in the manner described above, whereupon the tantalum is carburized.

I claim:

1. An electric lamp comprising a receptacle and an illuminating body consisting of a core containing rhenium, and a coating of tantalum carbide.

2. An electric lamp comprising a receptacle and an illuminating body consisting of a core consisting of rhenium, and a coating of tantalum carbide.

3. An electric lamp comprising a receptacle and an illuminating body consisting of a core consisting of an alloy of rhenium of high melting point, and a coating of tantalum carbide.

4. An electric lamp comprising a receptacle and an illuminating body consisting of a core of a metal of high melting point coated with rhenium, and a coating of tantalum carbide.

5. An electric lamp comprising a receptacle and an illuminating body consisting of a core of a metal of high melting point coated with a rhenium alloy, and a coating of tantalum carbide.

6. An illuminating body for use in incandescent or arc-lamps, comprising a core containing rhenium, and a coating of tantalum carbide.

7. An illuminating body for use in incandescent or arc-lamps, comprising a core consisting of pure rhenium, and a coating of tantalum carbide.

8. An illuminating body for use in incandescent or arc-lamps, comprising a core consisting of a rhenium alloy, and a coating of tantalum carbide.

9. An iluminating body for use in incandescent or arc-lamps, comprising a core of a metal of high melting point coated with rhenium, and a coating of tantalum carbide.

10. An illuminating body for use in incandescent or arc-lamps, comprising a core of a metal of high melting point coated with a rhenium alloy, and a coating of tantalum carbide.

In testimony whereof I hereunto affix my signature.

KURT AGTE.